United States Patent [19]

Horie

[11] 4,208,880
[45] Jun. 24, 1980

[54] HYDRAULIC BRAKE SYSTEM FOR VEHICLES

[75] Inventor: Mitsuyuki Horie, Susono, Japan

[73] Assignee: Toyota Jidosha Kogyo Kabushiki Kaisha, Toyota, Japan

[21] Appl. No.: 881,696

[22] Filed: Feb. 27, 1978

[30] Foreign Application Priority Data

Jul. 15, 1977 [JP] Japan .................. 52-84053

[51] Int. Cl.² .......................................... B60T 13/20
[52] U.S. Cl. ........................ 60/556; 60/559; 92/60.5
[58] Field of Search ............ 60/547 R, 555, 556, 60/557, 558, 559, 560, 592, 593; 92/60, 60.5

[56] References Cited

U.S. PATENT DOCUMENTS

| 2,455,984 | 12/1948 | Elliott | 60/558 |
| 3,078,678 | 2/1963 | Beatty | 60/555 |
| 3,208,224 | 9/1965 | Hoekstra | 60/558 |
| 3,259,146 | 7/1966 | Hager | 60/556 |
| 3,330,113 | 7/1967 | Perrino | 60/557 |
| 3,777,496 | 12/1973 | Mizusawa | 60/557 |
| 4,007,667 | 2/1977 | Elias | 92/60 |

FOREIGN PATENT DOCUMENTS

1134301  8/1962  Fed. Rep. of Germany ............ 60/557

*Primary Examiner*—Abraham Hershkovitz
*Attorney, Agent, or Firm*—Stevens, Davis, Miller & Mosher

[57] ABSTRACT

Disclosed is a hydraulic brake system for vehicles having a separated-type hydraulic fluid pressure amplifier, such as a hydraulic air servo or a hydraulic vacuum servo. This hydraulic brake system includes a brake master cylinder and said fluid pressure amplifier comprises a hydraulic piston and a control piston, which are moved by the pressure of working fluid from said master cylinder, and a power piston which is moved by the air pressure introduced by the action of the control piston. This hydraulic brake system further includes means for resiliently expanding a fluid passage provided in a part of the hydraulic passage between the brake master cylinder and the portion of the hydraulic fluid pressure amplifier in which the working fluid from the master cylinder is applied to said hydraulic piston and said control piston.

3 Claims, 10 Drawing Figures

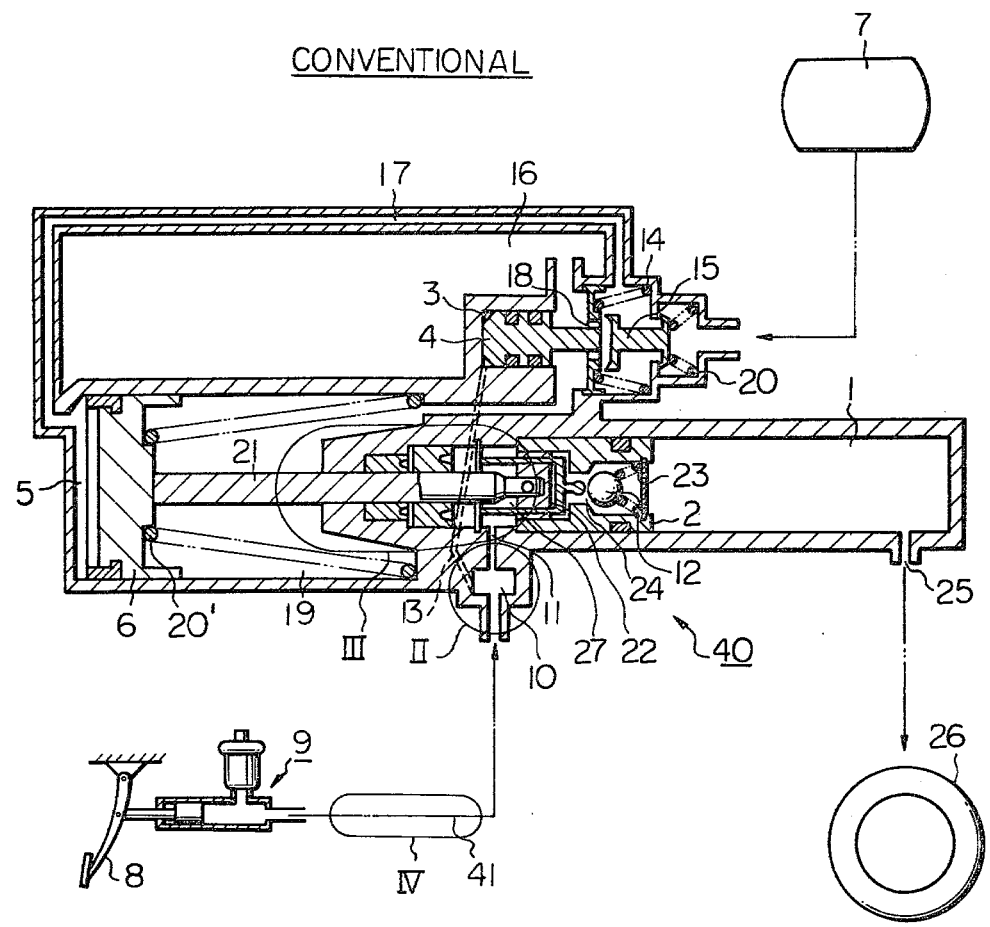
Fig. 1
CONVENTIONAL

HYDRAULIC BRAKE SYSTEM FOR VEHICLES

BACKGROUND OF THE INVENTION

The present invention relates to a hydraulic brake system for vehicles, and more particularly relates to a hydraulic brake system comprising a separated-type hydraulic booster located away from a brake master cylinder.

In a conventional hydraulic brake system known from prior art, vibration of working fluid occurs during the operation of a brake pedal and, as a result, the smooth operation of the brake pedal cannot be carried out, as will be described hereinafter.

The principal object of this invention is to provide a hydraulic brake system for vehicles, in which the working fluid supplied from a brake master cylinder into a separated-type hydraulic booster is controlled so that the pressure of the working fluid from the master cylinder is smoothly changed and, as a result, smooth operation of a brake pedal can be carried out.

BRIEF DESCRIPTION OF THE DRAWINGS

FIG. 1 is a view showing a conventional hydraulic brake system having a separated-type hydraulic air servo known from prior art;

FIGS. 4(A) and (B) are views illustrating embodiments of the present invention, which embodiments are applied in the portion indicated by reference numeral IV, in FIG. 1, wherein FIG. 4(A) illustrates an embodiment having a brake master cylinder and a hydraulic air servo both mounted on a chassis of vehicles and FIG. 4(B) illustrates an embodiment having a brake master cylinder mounted on a body and a hydraulic air servo mounted on a chassis;

DETAILED DESCRIPTION OF THE PREFERRED EMBODIMENTS

Figure 2:
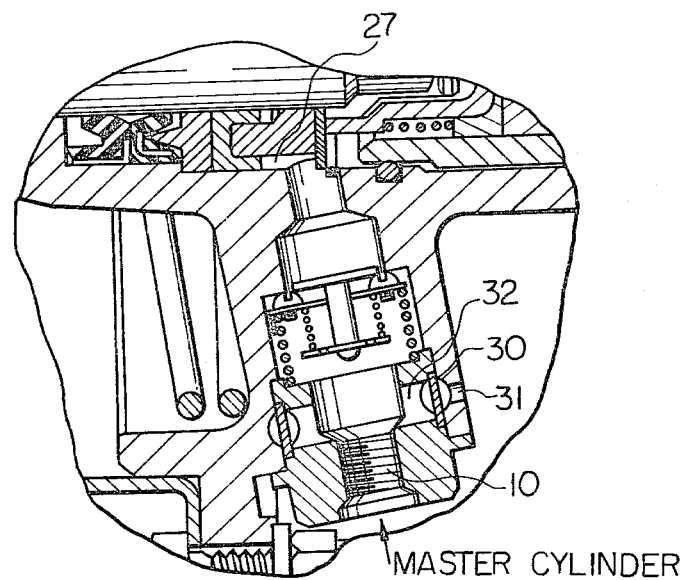
FIG. 2 is an enlarged and detailed view of a portion corresponding to the portion indicated by reference numeral II, in FIG. 1, in which portion an embodiment of the present invention is adopted.

Referring now to FIG. 1, a conventional hydraulic brake system having a separated-type hydraulic booster known from prior art is illustrated. This hydraulic booster is referred to as a hydraulic air servo and comprises a hydraulic piston 2 sealingly and slidingly disposed in a hydraulic cylinder 1, a control piston 4 sealingly and slidingly disposed in a control cylinder 3, a power piston 6 sealingly and slidingly disposed in a pneumatic chamber 5 and means for supplying compressed air, such as an air compressor 7. When pressure is applied to a brake pedal 8, the pressure of the working fluid in a brake master cylinder 9 rises and the working fluid is introduced into an inlet portion 10 of the hydraulic air servo. The working fluid is, then, introduced from the inlet portion 10 into the hydraulic cylinder 1 through a passage 11 and a check valve 12 as well as into the control cylinder 3 through a passage 13.

When the pressure of the working fluid in the control cylinder 3 rises, the control piston 4 moves against the force of a spring 14 to the right in the drawing and, then, comes into contact with a valve body 15. At the same time, the control piston 4 closes an opening 18, which communicates a passage 17 connected to the pneumatic chamber 5 with the atmosphere 16. Therefore, the communication between the atmosphere 16 and the pneumatic chamber 5 and the introduction of the atmosphere into the pneumatic chamber 5 is interrupted. The right side portion of the power piston 6 in the pneumatic cylinder 5, indicated by the numeral 19 in FIG. 1, is always communicated with the atmosphere 16, so that the pressure in said right side is always maintained at atmospheric pressure. When the control piston 4 moves further to the right in the drawing, the valve body 15 is pushed by means of the control piston 4 and moves to the right against the force of a spring 20. Compressed air is, then, supplied from the compressed air source 7 into the left side of the pneumatic chamber 5 in FIG. 1, through the passage 17. When the air pressure in the left side of the pneumatic chamber 5 rises, the power piston 6 moves to the right in the drawing against the force of a spring 20' and pushes the hydraulic piston 2, which is connected to a piston rod 21 of the piston 6 through a yoke member 22, to the right in the drawing. When the hydraulic piston 2 moves to the right in the drawing, a ball of the check valve 12 is pushed by means of a spring 23 and closes an opening 24 of the hydraulic piston 2. Consequently, the supply of working fluid from the brake master cylinder 9 into the hydraulic cylinder 1 is stopped. Due to the force of the power piston 6, the hydraulic piston 2 further moves to the right in the drawing and, then, working fluid in the hydraulic cylinder 1 is supplied to a hydraulic brake mechanism (not shown) of each wheel 26 via an outlet port 25.

The construction and operation of a hydraulic brake system having a hydraulic air servo known from prior art are as described above. In such a system, during a time of low pressure of the working fluid in the hydraulic cylinder 1, as the repulsion force of the working fluid (the force which pushes the hydraulic piston to the left in the drawing) is also small, the push rod 21 of the power piston 6 rapidly moves to the right in the drawing. The volume of a hydraulic chamber 27, therefore, rapidly increases. Consequently, the pressure of working fluid in the hydraulic chamber 27 and the control cylinder 3 is reduced, because the amount of working fluid being supplied from the brake master cylinder 9 via the inlet portion 10 into the hydraulic chamber 27 is not sufficient to maintain high pressure in the hydraulic chamber 27 and, therefore, a part of the working fluid in the control cylinder 3 flows backwardly into the hydraulic chamber 27. As the pressure in the control cylinder 3 is reduced, the control piston 4 moves to the left in the drawing due to the pressure of the compressed air from the compressor 7 and the force of springs 14 and 20. As a result, the supply of compressed air to the pneumatic chamber 5 is interrupted, so that the movement of the power piston 6, the push rod 21 and the hydraulic piston 2 is stopped. As the working fluid is continuously supplied from the brake master cylinder 9 to the hydraulic chamber 27, the pressure of working fluid in the hydraulic chamber 27 is again increased. Therefore, the motion described above is repeated and, during the time the pressure of working fluid in the control cylinder 3 is increasing, the working fluid generates a so called hydraulic vibration, which cannot be prevented by the operator, so that smooth operation of a brake pedal cannot be carried out.

In a hydraulic brake system of the present invention, means for resiliently expanding the volume of a fluid passage is provided in the fluid passage between a brake master cylinder 9 and the portion of a hydraulic booster (hydraulic aire servo) in which the working fluid from the brake master cylinder 9 is applied to a hydraulic piston 2 or a control piston 4. The resiliently expanding means absorbs the above-mentioned hydraulic vibration of the working fluid.

FIG. 2 is an enlarged and detailed view of a portion corresponding to the portion indicated by reference numeral II, in FIG. 1, in which portion an embodiment of the present invention is adopted. Referring to FIG. 2, a resilient member 30 made of a rubber or the like is sealingly mounted on the inner wall of a fluid passage of the inlet portion 10 of a hydraulic air servo. An air pocket or an aperture 31 communicated with the atmosphere is provided in the servo body behind the resilient member 30. The resilient member 30 sealingly separates a fluid passage 32 from the air pocket or the aperture 31 communicated with the atmosphere. Even if the working fluid from the master cylinder 9 generates the above-mentioned vibration, said vibration is absorbed and controlled due to resilient action of the resilient member 30. This is because, if the pressure of the working fluid from the master cylinder 9 is rapidly increased, the resilient member 30 is pushed toward the air pocket or the aperture 31 communicated with the atmosphere, and the volume of the fluid passage expands, so that the increace in the pressure of the working fluid is controlled. Contrary to this, if the pressure of the working fluid from the master cylinder 9 is rapidly decreased, the resilient member 30 is pulled toward the fluid passage 32 and the volume of the fluid passage is reduced, so that the decrease in the pressure of the working fluid is controlled. Therefore, the changes in the pressure of the working fluid, that is, the so called hydraulic vibration, is controlled and it is possible to operate a brake pedal smoothly.

Figure 3:
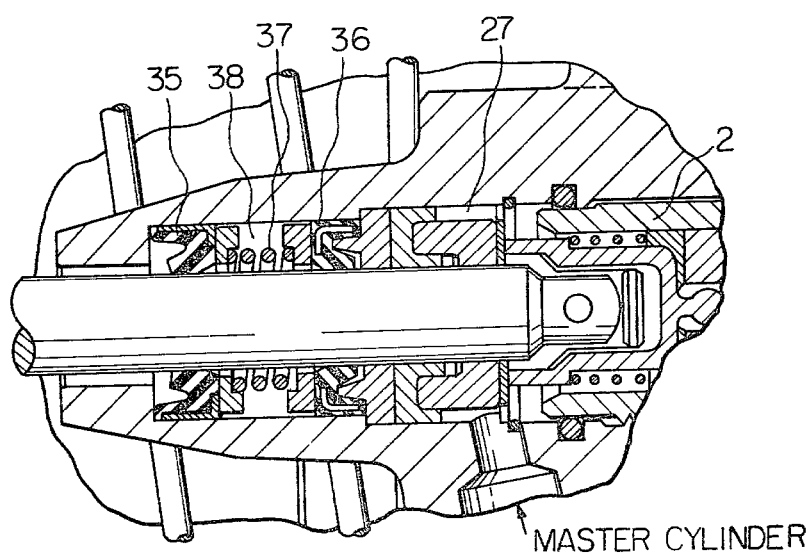
FIG. 3 is an enlarged and detailed view of a portion corresponding to the portion indicated by reference numeral III, in FIG. 1, in which portion another embodiment of the present invention is adopted.

FIG. 3 is an enlarged and detailed view of a portion corresponding to the portion indicated by reference numeral III, in FIG. 1, in which portion a second embodiment of the present invention is adopted. Referring to FIG. 3 in the hydraulic chamber 27, which is located behind the hydraulic piston 2 and constitutes a part of a hydraulic passage, and into which working fluid from the master cylinder 9 directly enters, means for resiliently expanding the volume of the hydraulic chamber 27 is provided. The expanding means comprises a dust seal 35 disposed at the left end seal portion of the chamber 27 in FIG. 3, an oil seal 36 and a compression spring 37 interposed between said two seals. Between the dust seal 35 and the oil seal 36 an air pocket 38 is formed. As the dust seal 35 is rigidly disposed and the oil seal 36 is movably disposed in the chamber 27, the volume of the hydraulic chamber 27 can be changed. As a result, the above-mentioned hydraulic vibration is remarkably controlled. That is to say, if the pressure of working fluid from the master cylinder 9 is rapidly increased, the pressure in the hydraulic chamber 27 is also increased and the oil seal 36 moves to the left in the drawing against the force of the compression spring 37 and, then, the volume of the hydraulic chamber 27 expands, so that the increase in the pressure of the working fluid is controlled. Contrary to this, if the pressure of the working fluid from the master cylinder 9 is rapidly decreased, the pressure in the hydraulic chamber 27 is also decreased and the oil seal 36 moves to the right in the drawing with the help of the compression spring 37 and, then, the volume of the hydraulic chamber 27 is reduced, so that the decrease in the pressure of the working fluid is controlled. Therefore, the changes in the pressure of the working fluid from the master cylinder 9, or the so called hydraulic vibration, is appropriately controlled, so that it will be possible to operate a brake pedal smoothly.

Figure 4:
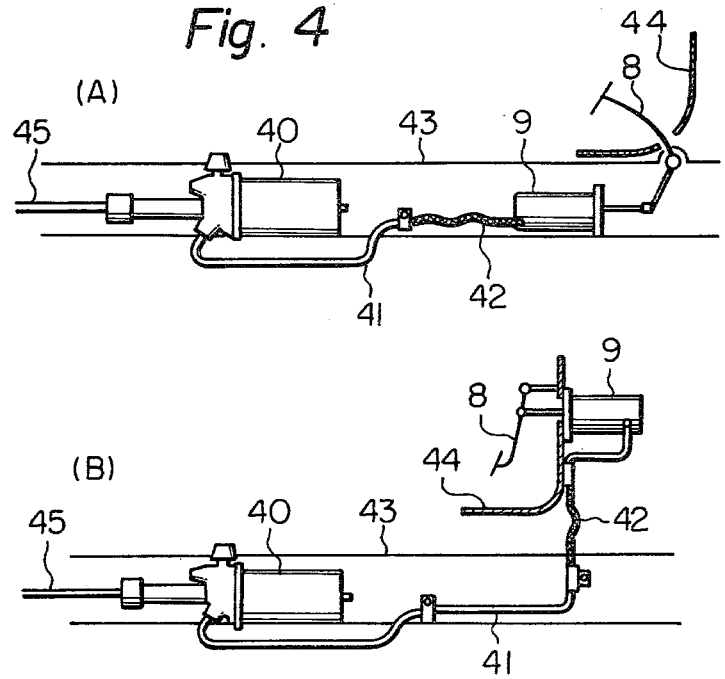

FIGS. 4(A) and (B) illustrate third embodiments of the present invention, which embodiments are provided in a portion corresponding to the portion indicated by reference numeral IV, in FIG. 1. Referring to FIGS. 4(A) and (B), a part of a hydraulic pipe 41 between the brake master cylinder 9 and the hydraulic air servo 40 is constituted with means for resiliently expanding the volume of the hydraulic passage, such as a flexible hose 42. The flexible hose 42 can be expanded and contracted in accordance with the pressure of the working fluid from the master cylinder 9, and controls the change of the pressure or the so called hydraulic vibration. In the embodiment shown in FIG. 4 (A), both the brake master cylinder 9 and the hydraulic air servo 40 are mounted on a chassis of a vehicle. In the embodiment shown in FIG. 4(B), the former is mounted on the chassis and the latter is mounted on the body of the vehicle, respectively. The embodiment shown in FIG. 4(B) can be used if a relative movement is generated between the chassis 43 and the body 44, because the portion of the hydraulic passage between the chassis and the body is constituted by the flexible hose 42. The numeral 45 indicates a pipe member for supplying working fluid to a wheel brake assembly (not shown) of each wheel.

Figure 5:
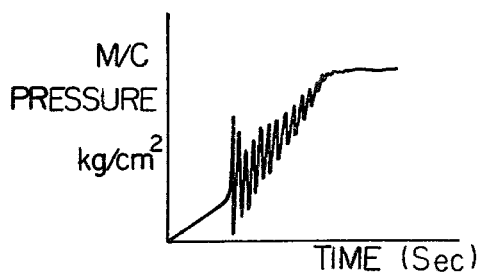
FIG. 5 is a diagram illustrating the change of the pressure of the working fluid in a master cylinder in a conventional hydraulic brake system.
Figure 6:
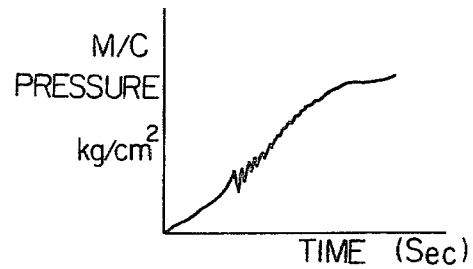
FIG. 6 is a diagram illustrating the change of the pressure of the working fluid in a master cylinder in a hydraulic brake system of the present invention.

FIGS. 5 and 6 are diagrams illustrating the changes in the hydraulic pressure of the working fluid from master cylinders in a conventional hydraulic brake system and a hydraulic brake system of the present invention, respectively. As will be understood from these diagrams, according to the present invention, during the time the pressure of the working fluid from the master cylinder 9 increases, the hydraulic vibration can be remarkably controlled. In these diagrams, the axes of the abscissa indicate time and the axes of the ordinate indicate the hydraulic pressure.

The above description relates to hydraulic brake system having a hydraulic air servo as a hydraulic pressure amplifier. However, in a conventional hydraulic brake system having another separated-type hydraulic booster, such as a hydraulic vacuum servo, the same problem of hydraulic vibration also arises. This problem will be now described with reference to the accompanying drawings.

Figure 7:
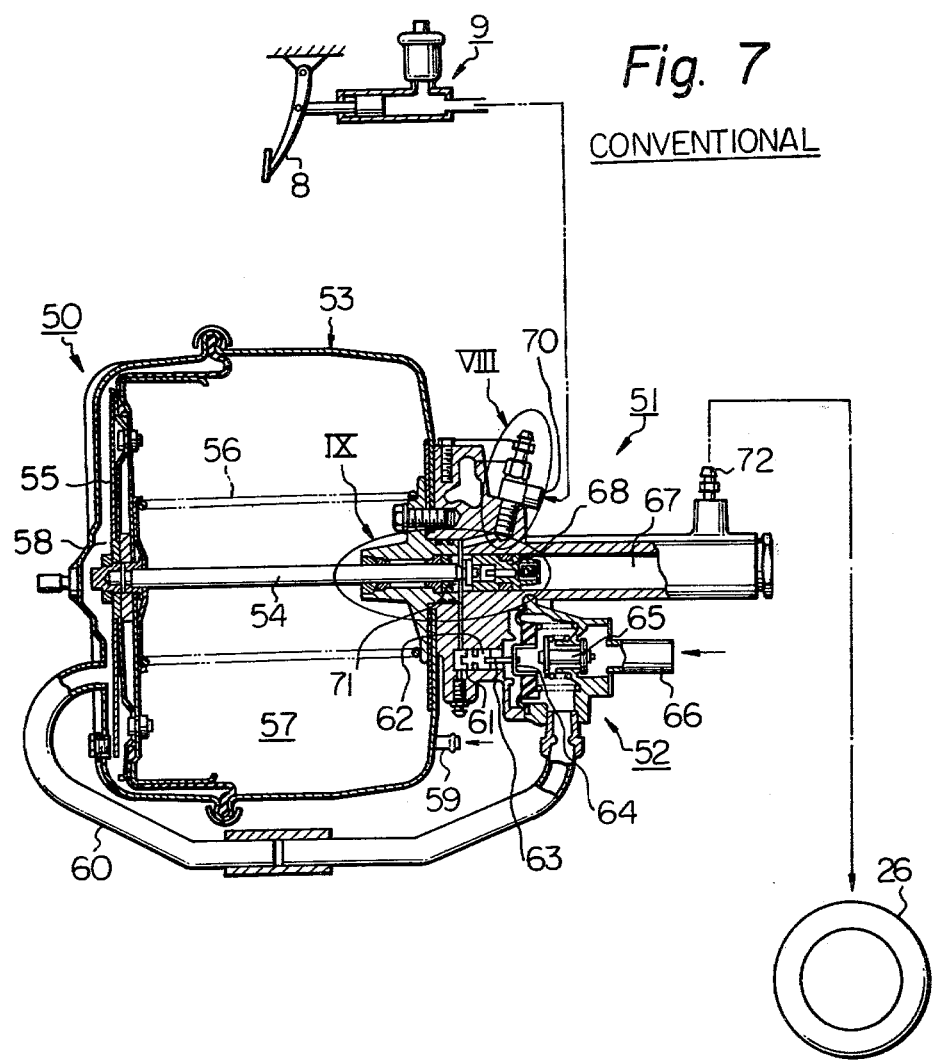
FIG. 7 is a view illustrating a conventional hydraulic brake system having a separated-type hydraulic vacuum servo known from prior art.

FIG. 7 illustrates a conventional hydraulic brake system having a separated-type hydraulic vacuum servo known from prior art. In FIG. 7, numerals 50, 51 and 52 indicate a pneumatic power working portion, a hydraulic cylinder portion and a control portion, respectively. When pressure is applied to a brake pedal 8, the pressure of the working fluid in a brake master cylinder 9 is increased. As a result, working fluid is introduced into a hydraulic chamber 71 through a fluid inlet portion 70 of the hydraulic vacuum servo, as well as into a control cylinder 61. When the pressure in the control cylinder 61 is increased and a control piston 62 moves to the right in the drawing, a diaphragm 64 secured to a piston rod 63 of the control piston 62 pushes a control valve 65 to the right in the drawing and opens the valve opening thereof. Then, air is introduced from an air pipe 66 opened to the atmosphere through the control valve 65 and a pipe 60 into a pneumatic working chamber 58. As a vacuum chamber 57 is communicated with a suitable vacuum source, such as an intake manifold of the engine, through an opening 59 and a vacuum is always maintained therein, a diaphragm 55 in a casing 53 pushes a power piston 54 to the right in the drawing against the force of a spring 56. As a hydraulic piston 68 in a hydraulic cylinder 67 is connected to the power piston 54, the hydraulic piston 68 also moves to the right in the drawing and, as a result, working fluid in the hydraulic cylinder 67 is supplied through an outlet port 72 to a wheel brake assembly (not shown) of each wheel 26. During the rightward movement of the power piston 54 in the drawing, however, the volume of the hydraulic chamber 71 is rapidly increased and, consequently, the hydraulic pressure from the master cylinder 9 is temporarily reduced, which results in the so called hydraulic vibration.

According to the present invention, in the same manner as with the hydraulic brake system having a hydraulic air servo described above, means for resiliently expanding a fluid passage is provided in a part of the hydraulic passage between a brake master cylinder 9 and the portion of a hydraulic vacuum servo in which the working fluid from the brake master cylinder 9 is applied to a hydraulic piston 68 or a control piston 62. The resiliently expanding means absorbs the above-mentioned vibration of working fluid from the brake master cylinder 9.

Figure 8:
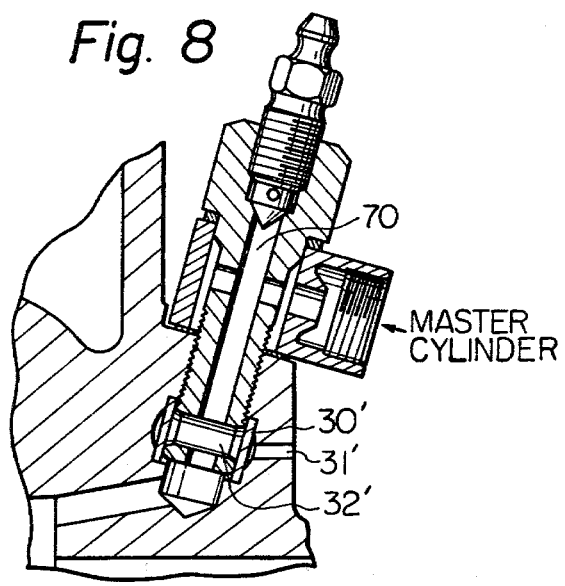
FIG. 8 is an enlarged and detailed view of a portion corresponding to the portion indicated by reference numeral VIII, in FIG. 7, in which portion an embodiment of the present invention is adopted.
Figure 9:
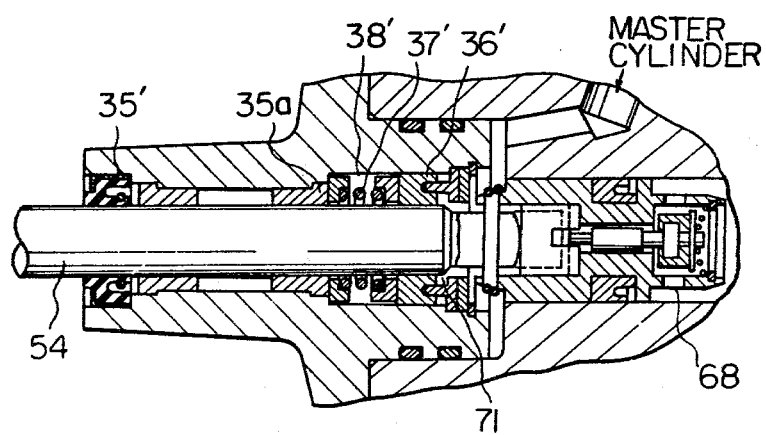
FIG. 9 is an enlarged and detailed view of a portion corresponding to the portion indicated by reference numeral IX, in FIG. 7, in which portion another embodiment of the present invention is adopted.

FIGS. 8 and 9 illustrate embodiments which correspond to the embodiments shown in FIGS. 2 and 3, respectively, but which are adopted to a hydraulic brake system having a hydraulic vacuum servo shown in FIG. 7.

FIG. 8 is an enlarged and detailed view of a portion corresponding to the portion indicated by reference numeral VIII, in FIG. 7, in which portion an embodiment of this invention is adopted. Referring to FIG. 8, a resilient member 30' made of rubber or the like is sealingly mounted on the inner wall of a fluid passage of a fluid inlet portion 70 of a hydraulic vacuum air servo. An air pocket or an aperture 31' communicated with the atmosphere is provided behind of the resilient member 30'. The resilient member 30' sealingly separates a fluid passage 32' from the air pocket or the aperture 31' communicated with the atmosphere. Even if the working fluid from the master cylinder 9 generates the above-mentioned vibration, the vibration of working fluid is absorbed and controlled due to resilient action of the resilient member 30'. This is because, if the pressure of working fluid from the master cylinder 9 is rapidly increased, the resilient member 30' is pushed toward the air pocket or the aperture 31' communicated with the atmosphere and the volume of the fluid passage 32' expands, so that the increase in the pressure of the working fluid is controlled. Contrary to this, if the pressure of working fluid from the master cylinder 9 is rapidly decreased, the resilient member 30' is pulled toward the fluid passage 32' and the volume of the fluid passage 32' is reduced, so that the decrease in the pressure of the working fluid is controlled. Therefore, the changes in the pressure of the working fluid, the so called hydraulic vibration, is controlled and it is possible to operate a brake pedal smoothly.

FIG. 9 is an enlarged and detailed view of a portion corresponding to the portion indicated by reference numeral IX, in FIG. 7, in which portion another embodiment of this invention is adopted. Referring to FIG. 7, in a hydraulic chamber 71, which is located behind a hydraulic piston 68, constitutes a part of a hydraulic passage and into which working fluid from a master cylinder 9 directly enters, means for resiliently expanding the volume of the hydraulic chamber 71 is provided. The expanding means comprises a dust seal 35' disposed at the left end seal portion of the chamber 71 in FIG. 9, an oil seal 36' and a compression spring 37' interposed between said two seals. Between the dust seal 35' and the oil seal 36', an air pocket 38' is formed. As the dust seal 35' is rigidly disposed and the oil seal 36' is movably disposed in the chamber 71, the volume of the hydraulic chamber 71 can be changed, which results in control of the above-mentioned hydraulic vibration. That is to say, if the pressure of the working fluid from the master cylinder 9 is rapidly increased, the pressure in the hydraulic cylinder 71 is also increased and the oil seal 36' moves to the left in the drawing against to the compression spring 37' and, as a result, the volume of the hydraulic chamber 71 expands, so that the increase in the pressure of the working fluid is controlled. Contrary to this, if the pressure of the working fluid from the master cylinder 9 is rapidly decreased, the pressure in the hydraulic chamber 71 is also decreased and the oil seal 36' moves to the right in the drawing with the help of the compression spring 37' and, as a result, the volume of the hydraulic chamber 71 is reduced, so that the decrease in the pressure of the working fluid is controlled. Therefore, the changes in the pressure of the working fluid from the master cylinder 9, or the so called hydraulic vibration, is appropriately controlled, so that it is possible to operate a brake pedal smoothly.

Various changes and modifications of this invention may be made by persons skilled in the art without departing from the scope and spirit of this invention. For example, it is easily understood that, in the hydraulic brake system having a hydraulic vacuum servo as shown in FIG. 7, an embodiment illustrated in FIGS. 4(A) and (B) can also be adopted.

What is claimed is:

1. A hydraulic brake system for vehicles comprising:
   a brake master cylinder;
   a separated-type hydraulic booster including a hydraulic cylinder, a hydraulic piston sealingly and slidingly disposed in said hydraulic cylinder and defining in front of said hydraulic piston an outlet fluid chamber connected with a wheel brake mechanism and behind said hydraulic piston a hydraulic chamber into which working fluid is introduced from said brake master cylinder, a control cylinder, a control piston sealingly and slidingly disposed in said control cylinder into which working fluid is also introduced from said brake master cylinder, a casing, a pneumatic chamber defined in said casing, a power piston sealingly and slidingly disposed in said pneumatic chamber, fluid passage means in said hydraulic piston and connecting said hydraulic chamber and said outlet fluid chamber with each other, and control valve means in said fluid passage means and closable as a result of axial movement of said power piston, said power piston having a piston rod extending axially through said hydraulic chamber and connected with said hydraulic piston for limited axial movement relative thereto, said power piston being moved by air pressure, which is introduced from an air pressure source into said pneumatic chamber when said control piston is moved by the working fluid introduced into said control cylinder, so that said hydraulic piston is moved so as to supply the working fluid in said outlet chamber into said wheel brake mechanism; and means for resiliently expanding the volume of said hydraulic chamber, said resiliently expanding means comprising a dust seal fixedly disposed in said hydraulic chamber on the side thereof adjacent the pneumatic chamber, an oil seal slidingly and sealingly disposed in said hydraulic chamber, an air pocket between said dust seal and said oil seal fluidically isolated from said outlet fluid chamber and biasing said dust seal and said oil seal away from each other, and a compression spring member in the air pocket between said dust seal and said oil seal, and the piston rod of the power piston extends through the dust seal and the oil seal and slidably engages both, the dust seal and the oil seal.

2. A hydraulic brake system as set forth in claim 1, wherein said separated-type hydraulic booster is a hydraulic air servo.

3. A hydraulic brake system as set forth in claim 1, wherein said separated-type hydraulic booster is a hydraulic vacuum servo.

* * * * *